(12) United States Patent
Yang et al.

(10) Patent No.: US 11,547,090 B2
(45) Date of Patent: Jan. 10, 2023

(54) COMBINED ADJUSTABLE PET BALL-THROWING ROD

(71) Applicant: ZHUHAI HENGQIN SUPER TECHNOLOGY LTD., Zhuhai (CN)

(72) Inventors: Tianle Yang, Zhuhai (CN); Yibao Zeng, Zhuhai (CN)

(73) Assignee: ZHUHAI HENGQIN SUPER TECHNOLOGY LTD., Zhuhai (CN)

( * ) Notice: Subject to any disclaimer, the term of this patent is extended or adjusted under 35 U.S.C. 154(b) by 199 days.

(21) Appl. No.: 16/958,712

(22) PCT Filed: Apr. 9, 2019

(86) PCT No.: PCT/CN2019/081851
§ 371 (c)(1),
(2) Date: Jun. 28, 2020

(87) PCT Pub. No.: WO2019/228070
PCT Pub. Date: Dec. 5, 2019

(65) Prior Publication Data
US 2020/0329672 A1    Oct. 22, 2020

(30) Foreign Application Priority Data

May 28, 2018 (CN) .......................... 201820802346.7

(51) Int. Cl.
*A01K 15/02* (2006.01)
(52) U.S. Cl.
CPC .......... *A01K 15/025* (2013.01); *A01K 15/027* (2013.01)
(58) Field of Classification Search
CPC .... A01K 15/025; A01K 15/02; A01K 15/027; A63H 33/18; A63B 2208/14; A63B 65/12; A63B 59/30; A63B 47/02; A63B 47/00; A63B 57/20; F41B 3/04; F41B 3/00;

(Continued)

(56) References Cited

U.S. PATENT DOCUMENTS

| | | | |
|---|---|---|---|
| 2008/0004140 A1* | 1/2008 | Matsumoto | .......... A01K 15/025 473/513 |
| 2010/0018511 A1 | 1/2010 | Lendvay | |
| 2016/0120148 A1* | 5/2016 | Hill | ........................ A01K 15/02 124/5 |

FOREIGN PATENT DOCUMENTS

| | | |
|---|---|---|
| CN | 202738596 U | 2/2013 |
| CN | 203952107 U | 11/2014 |

(Continued)

*Primary Examiner* — Peter M Poon
*Assistant Examiner* — Jeffrey R Larsen
(74) *Attorney, Agent, or Firm* — Bayramoglu Law Offices LLC

(57) ABSTRACT

A combined adjustable pet ball-throwing rod includes a rod body. A front ball socket is fixed to a first end of the rod body. The front ball socket has a hollow connecting tube. A rear ball socket is detachable and slidably sleeved on the connecting tube. The front ball socket and the rear ball socket form an elastic ball socket. The connecting tube is provided with a retaining portion, the first end of the rod body is provided with a buckling portion, and the buckling portion is buckled in the retaining portion. The quantity of the retaining portions is two, and the two retaining portions are respectively located on two opposite side walls of the connecting tube. The quantity of the buckling portions is two, and one buckling portion is buckled in one retaining portion.

18 Claims, 7 Drawing Sheets

(58) Field of Classification Search
CPC ..... A61H 2003/0222; B25J 1/04; B25J 15/12;
B25B 9/04; B25B 9/00
USPC ......... 119/707, 702; 473/460, 517; 224/247,
224/558; 81/487, 129
See application file for complete search history.

(56) References Cited

FOREIGN PATENT DOCUMENTS

| | | |
|---|---|---|
| CN | 208639305 U | 3/2019 |
| DE | 4315124 A1 | 11/1994 |

* cited by examiner

COMBINED ADJUSTABLE PET BALL-THROWING ROD

CROSS REFERENCE TO THE RELATED APPLICATIONS

This application is the national phase entry of International Application No. PCT/CN2019/081851, filed on Apr. 9, 2019, which is based upon and claims priority to Chinese Patent Application No. 201820802346.7, filed on May 28, 2018, the entire contents of which are incorporated herein by reference.

TECHNICAL FIELD

The present disclosure relates to the field of pet products, and more particularly, to a combined adjustable pet ball-throwing rod.

BACKGROUND

A pet ball-throwing rod is typically a pet toy including a rod body and a hemispherical socket arranged at the end of the rod body. In use, a toy ball is placed into the hemispherical socket, the dog owner grasps the rod body and throws the toy ball. Due to the acceleration given by the rod body, the toy ball is launched in the direction of the throw. Then, pets like a dog will pursue and fetch the ball, retrieve the ball, and bring it back to the owner, which can enhance the responsiveness and cooperativeness during use.

However, pet ball-throwing rods in the prior art have the following deficiencies. 1. The ball socket on one ball-throwing rod has a non-adjustable size and thus can only fit into the toy ball in a specific size, which has poor compatibility. 2. Ball sockets are mostly plastic and retain the toy balls by elastic deformation, however, the ball sockets are likely to become loose after long-term use and fail to retain the toy balls of equal size for continuous use.

SUMMARY

Technical Problem

The objective of the present disclosure is to provide a combined adjustable pet ball-throwing rod capable of retaining toy balls in different sizes.

Technical Solution

In order to achieve the above-mentioned objective, the present disclosure provides a combined adjustable pet ball-throwing rod, including a rod body. A front ball socket is fixed to a first end of the rod body. The front ball socket is provided with a hollow connecting tube. A rear ball socket is detachable and slidably sleeved on the connecting tube. The front ball socket and the rear ball socket form an elastic ball socket.

Preferably, the connecting tube is provided with a retaining portion, the first end of the rod body is provided with a buckling portion, and the buckling portion is buckled in the retaining portion.

Further, the quantity of the retaining portions is two, and the two retaining portions are respectively located on two side walls of the connecting tube opposite to each other. The quantity of the buckling portions is two, and one buckling portion is buckled in one retaining portion.

Further, the first end of the rod body is provided with a base body, and the two buckling portions are respectively located on both sides of the base body.

Further, a through hole is formed on the connecting tube. A locking hole corresponding to the through hole is formed at the first end of the rod body, and a locking member passes through the through hole and the locking hole.

Further, the front ball socket is provided with a first elastic claw provided at one end of the connecting tube, and the first elastic claw is an elastic piece recessed opposite to the rear ball socket.

Further, an opening is formed in the middle of the first elastic claw, and the opening extends to the edge of the first elastic claw.

Further, the rear ball socket includes a hollow sleeve, the hollow sleeve is sleeved outside the connecting tube, and a locking device is provided on one side of the hollow sleeve to fix the hollow sleeve outside the connecting tube.

Further, a through slot is provided on one side wall of the hollow sleeve. The locking device includes two rotating lugs provided on the side wall of the hollow sleeve. The two rotating lugs are respectively located at the two ends of the through slot in the lengthwise direction of the through slot. Each rotating lug extends outward from the side wall of the hollow sleeve. The middle of each rotating lug is provided with a shaft hole, and the rotating shaft is arranged in the shaft hole. A flip portion is rotatably sleeved outside the rotating shaft. The flip portion is provided with an eccentric hole, and the rotating shaft passes through the eccentric hole. The locking device further includes a locking body, and the locking body is located between the flip portion and the through slot.

Further, a plurality of positioning grooves are provided on the surface of the connecting tube facing the locking device. A positioning member is provided on a side of the locking body close to the connecting tube. The surface of the positioning member facing the connecting tube is provided with at least one positioning protrusion, and the positioning protrusion is engaged with the positioning groove.

Further, the plurality of positioning grooves are arranged parallel to one another and spaced apart along the lengthwise direction of the connecting tube.

Further, the quantity of the positioning protrusions is more than two, and the quantity of the positioning grooves is greater than the quantity of the positioning protrusions.

Further, both sides of the through slot are provided with a blocking rib in the width direction of the through slot.

Further, the rear ball socket includes a second elastic claw provided at one end of the hollow sleeve, and the second elastic claw is an elastic piece recessed opposite to the front ball socket.

Further, the first elastic claw and the second elastic claw are located on the outer surface of the elastic ball socket.

Further, the second end of the rod body is provided with a grip.

Further, the second end of the rod body is provided with a hanging hole.

Technical Solution to the Problem

The advantages of the present disclosure are as follows.

In the present disclosure, the pet ball-throwing rod is provided with the fixed front ball socket, and the rear ball socket is connected to the front ball socket and can slide relative to the front ball socket. In other words, the distance between the front ball socket and the rear ball socket is adjustable. In this way, for toy balls of different sizes, the distance between the front ball socket and the rear ball socket can be adjusted to fit into different toy balls.

Moreover, the front ball socket can be fixed to the first end of the rod body by the locking member such as a screw. In this way, the worn front ball socket can be replaced with a new front ball socket. In addition, the rear ball socket is detachable, and similarly, the worn rear ball socket can be replaced. Thus, the entire throwing rod is still usable after replacing the worn front ball socket or rear ball socket, which avoids the waste of ball throwing rods and is convenient to use. Besides, the rod bodies can also be replaced with rods of different lengths for users of different heights.

In addition, the front ball socket and the rod body can also be fixed by the snap-fit of the retaining portions and the buckling portions, which facilitates the positioning between the front ball socket and the rod body. The quantity of the retaining portions and the quantity of the buckling portions are both two, which improves the accuracy of the connection between the front ball socket and the rod body.

The front ball socket is provided with the first elastic claw, and the rear ball socket is provided with the second elastic claw. The two elastic claws are matched with each other to form the elastic ball socket for retaining the toy ball, and the elastic claws apply a moderate force on the toy ball, so that the user can throw the toy ball with ease.

In addition, the rear ball socket is provided with a hollow sleeve, and the hollow sleeve can be sleeved outside the connecting tube of the front ball socket. The positional relationship between the front ball socket and the rear ball socket can be adjusted by moving the hollow sleeve, so as to regulate the rear ball socket.

In the present disclosure, the rear ball socket is locked by the locking device, and the locking device is fixed by the flip portion with the eccentric hole. When the position of the rear ball socket needs to be adjusted, the flip portion is opened to facilitate adjusting the position of the rear ball socket. When the rear ball socket needs to be locked, the flip portion is rotated to the locked position to press the connecting tube of the front ball socket by the locking body, and the front ball socket and the rear ball socket are fixed by friction.

In another embodiment of the present disclosure, the positioning groove is provided on the connecting tube of the front ball socket, and the positioning member is provided on the side of the locking body close to the connecting tube. In addition, the positioning protrusion is provided on the surface of the positioning member and engaged with the positioning groove to realize the positioning between the front ball socket and the rear ball socket, and to facilitate fixing and positioning the rear ball socket.

The blocking rib is provided in the width direction of the through slot to increase the friction between the edge of the through slot and the locking body, which prevents the locking body from falling free of the through slot, improves the locking stability of the rear ball socket, and prevents the locked rear ball socket from sliding relative to the front ball socket.

DETAILED DESCRIPTION OF THE EMBODIMENTS

The present disclosure will be further described hereinafter with reference to the drawings and embodiments.

First Embodiment

Figure 1:
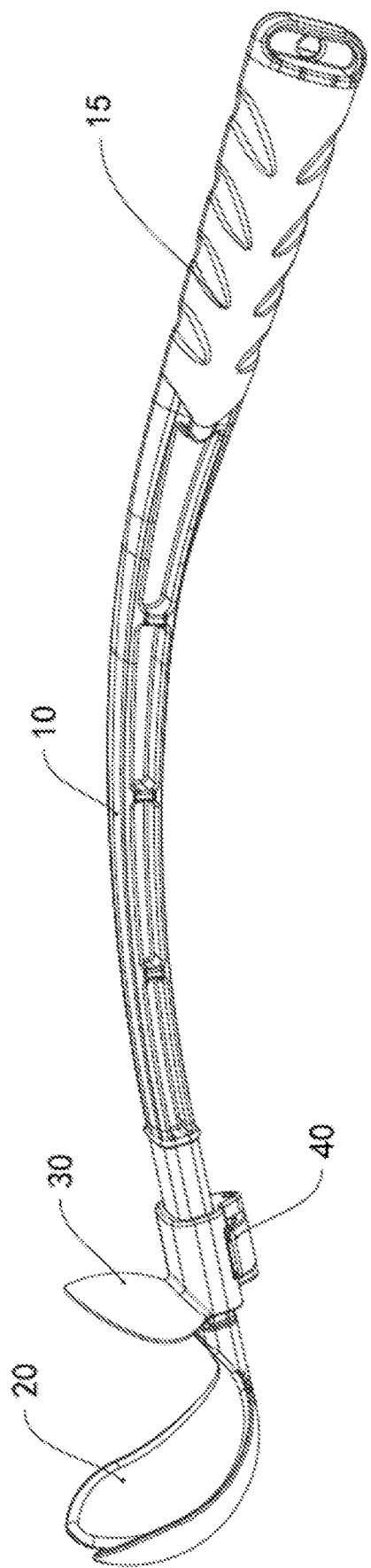
FIG. 1 is a structural schematic diagram of the combined adjustable pet ball-throwing rod according to a first embodiment of the present disclosure.
Figure 2:
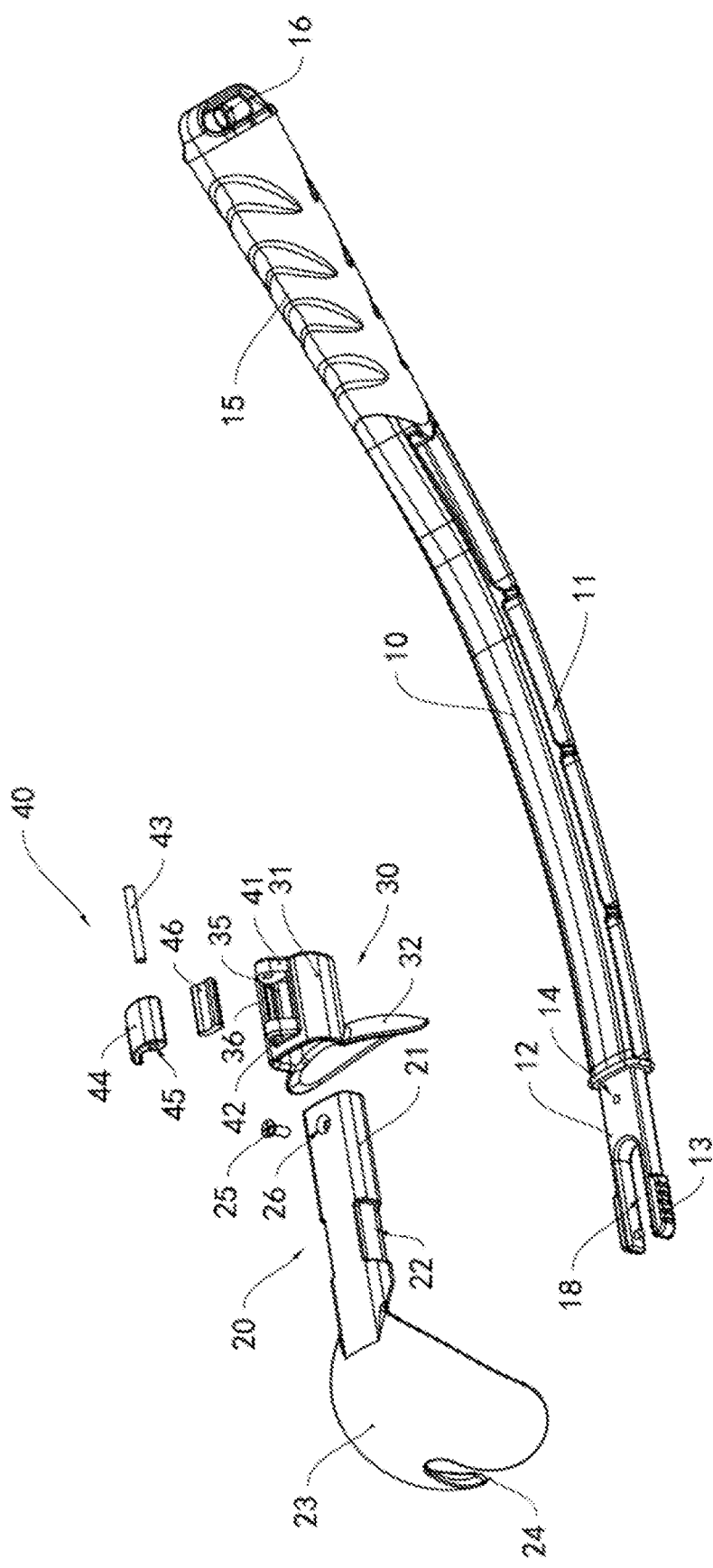
FIG. 2 is an exploded view showing the structures of the combined adjustable pet ball-throwing rod according to the first embodiment of the present disclosure.

Referring to FIG. 1 and FIG. 2, in the present embodiment, the combined adjustable pet ball-throwing rod includes the rod body 10, the front ball socket 20, the rear ball socket 30 and the locking device 40.

The rod body 10 is curved and elongated. The front ball socket 20 and the rear ball socket 30 are located at the first end of the rod body 10. The grip 15 is provided at the second end of the rod body 10. The hanging hole 16 is also provided at the second end of the rod body 10. In the present embodiment, the front ball socket 20 is fixed to the first end of the rod body 10, and the rear ball socket 30 can move forward and backward relative to the front ball socket 20 to adjust the positional relationship between the front ball socket 20 and the rear ball socket 30. The locking device 40 is provided on one side of the rear ball socket 30 and configured to lock the rear ball socket 30 on the front ball socket 20.

In the present embodiment, the second end of the rod body 10 is provided with the grip 15 that can be handily held by users. The grip 15 is designed ergonomically so that the users can comfortably hold the grip 15. The overall shape of the rod body 10 conforms to ergonomics and aerodynamics, so that users can comfortably grasp the rod and throw the toy ball with ease. Referring to FIG. 2, a plurality of long grooves 11 are provided on the side wall of the rod body 10 to facilitate the bending deformation of the rod body 10 in the course of throwing the toy ball, which prevents the rod body 10 from being broken after long-term use. The hanging hole 16 provided at the second end of the rod body 10 and is used for hanging the throwing rod on a hook of the wall.

Optionally, the toy ball can also be attached to the hanging hole 16 when provided with a hook or a strap.

The first end of the rod body 10 is provided with the base body 12. Two buckling portions 13 are provided at the end of the base body 12. The two buckling portions 13 are respectively located on the left side wall and the right side wall of the base body 12. Preferably, each buckling portion 13 is elongated, and a texture with a recessed configuration is provided on the outer surface of the buckling portion 13 for convenience of pressing the buckling portion 13. The U-shaped notch 18 is provided at the end of the base body 12. Two buckling portions 13 are located on both sides of the U-shaped notch 18, respectively. In addition, the locking hole 14 is provided on one surface of the base body 12. Preferably, the locking hole 14 is a threaded hole, and the inner wall of the locking hole 14 is provided with an internal thread.

The front ball socket 20 is detachably installed to the first end of the rod body 10. The front ball socket 20 includes the hollow connecting tube 21. The cross section of the connecting tube 21 is substantially rectangular. Two side walls of the connecting tube 21 opposite to each other are both provided with the retaining portion 22, and each retaining portion 22 corresponds to the buckling portion 13. In this way, when the front ball socket 20 is fixed to the first end of the rod body 10, the two buckling portions 13 are respectively locked in the corresponding retaining portions 22, and the front ball socket 20 and the rod body 10 are fixedly connected by the retaining portions 22 buckled to the buckling portions 13. When the connecting tube 21 is sleeved on the base body 12 of the rod body 10, the end of the base body 12 will be deformed. Specifically, due to the presence of the U-shaped notch 18, the two buckling portions 13 are pressed to approach each other and enter the connecting tube. After reaching the retaining portion 22, the buckling portion 13 is completely engaged with the retaining portion 22 to realize the positioning of the front ball socket 20 and the rod body 10. Preferably, the base body 12 is made of an elastic material, e.g., plastic.

In addition, the through hole 26 is formed on a wall of the connecting tube 20, and matched with the locking hole 14 of the base body 12. When the front ball socket 20 is mounted to the rod body 10, the through hole 26 directly faces the locking hole 14. At this time, the front ball socket 20 can be fixed to the first end of the rod body 10 by screwing the screw 25 through the through hole 26 and the locking hole 14. Optionally, rivets or other fasteners can also be used as the equivalent of the screw 25.

One end of the front ball socket 20 is provided with the first elastic claw 23 used for retaining the toy ball. Preferably, the first elastic claw 23 is made of an elastic material, e.g., silicone, plastic, etc. In addition, the middle of the first elastic claw 23 is provided with the opening 24, and the opening 24 extends to the edge of the first elastic claw 23. The first elastic claw 23 is a curved surface and fixed at one end of the connecting tube 21. As shown in FIG. 2, the first elastic claw 23 is an elastic piece recessed opposite to the rear ball socket 30. In other words, the convex surface of the first elastic claw 23 is away from the rear ball socket 30, and the concave surface of the first elastic claw 23 faces the rear ball socket 30.

The rear ball socket 30 is provided with the hollow sleeve 31 that is substantially rectangular. The inner diameter of the hollow sleeve 31 is slightly larger than the outer diameter of the connecting tube 21 of the front ball socket 20, so that the rear ball socket 30 can be sleeved on the connecting tube 21 of the front ball socket 20 and can slide freely. In addition, the elongated through slot 35 is formed on a side wall of the hollow sleeve 31. The through slot 35 extends along the lengthwise direction of the hollow sleeve 31 and penetrates the side wall of the hollow sleeve 31.

The second elastic claw 32 is provided at one end of the hollow sleeve 31. The second elastic claw 32 is also made of an elastic material such as silicone and plastic. Also, the second elastic claw 32 is an arc-shaped piece. The concave surface of the second elastic claw 32 faces the first elastic claw 23 and the convex surface of the second elastic claw 32 faces the grip 15. The first elastic claw 23 and the second elastic claw 32 form an elastic ball socket, and the toy ball is clamped by the first elastic claw 23 and the second elastic claw 32. It can be seen that the first elastic claw 23 and the second elastic claw 32 are located on the outer surface of the elastic ball socket.

The hollow sleeve 31 is sleeved outside the connecting tube 21 and can slide relative to the connecting tube 21, so that the front ball socket 20 and the rear ball socket 30 can move relative to each other. The locking device 40 is provided outside a side wall of the hollow sleeve 31 of the rear ball socket 30 to fix the relative position between the rear ball socket 30 and the front ball socket 20. The locking device 40 includes two rotating lugs 41 and 42. Each of the two rotating lugs 41 and 42 is provided on a side wall of the hollow sleeve 31 and located at both ends of the through slot 35 in the lengthwise direction of the through slot 35. Each rotating lug 41 or 42 protrudes outward from the side wall of the hollow sleeve 31 and is provided with a through hole. The rotating shaft 43 is arranged in the two through holes.

The locking device 40 further includes the flip portion 44 and the locking body 46. The flip portion 44 is provided with the shaft hole 45, and the rotating shaft 43 passes through the shaft hole 45, so that the flip portion 44 can rotate around the rotating shaft 43. In addition, the shaft hole 45 is an eccentric shaft hole, namely, the shaft hole 45 is not located on the axis of the main body of the flip portion 44 but is formed away from the axis of the main body of the flip portion 44. The locking body 46 is located between the flip portion 44 and the through slot 35 and is pushed toward the through slot 35 by the flip portion 44. Preferably, a part of the locking body 46 passes through the through slot 35 and contacts the outer surface of the connecting tube 21. In addition, the locking body 46 is made of a material with a high friction coefficient, e.g., rubber, which can increase the friction between the locking body 46 and the connecting tube 21.

Figure 3:
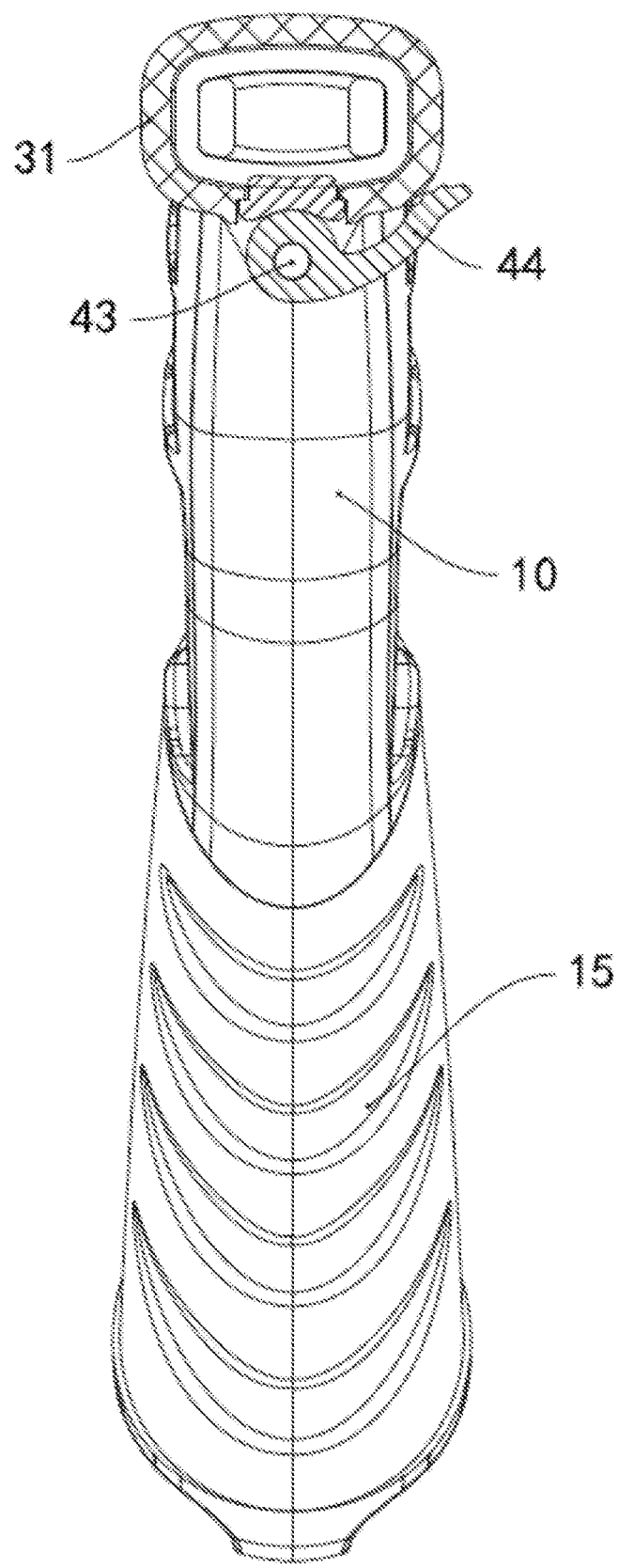
FIG. 3 is a cross-sectional view of the combined adjustable pet ball-throwing rod in a locked state according to the first embodiment of the present disclosure.

In the present embodiment, the shape of the cross section of the locking body 46 is consistent with the shape of the side wall of the through slot 35. The locking body 46 has a T-shaped cross section. As shown in FIG. 3, the smaller end of the locking body 46 is engaged with the through slot 35, and the larger end of the locking body 46 is exposed outside the through slot 35. Since the flip portion 44 can rotate around the rotating shaft 43, when the flip portion 44 is in the open position, the shaft hole 45 is located on the smaller side of the main body of the flip portion 44. The friction force exerted by the locking body 46 on the connecting tube 21 is relatively small, and the hollow sleeve 31 of the rear ball socket 30 can slide relative to the connecting tube 21 to adjust the relative position between the front ball socket 20 and the rear ball socket 30. When the flip portion 44 is in the closed position, the shaft hole 45 is located on the larger side of the main body of the flip portion 44. At this time, the flip portion 44 presses the locking body 46 to move toward the connecting tube 21, so as to tightly press the connecting tube 21 of the front ball socket 20, and fix the rear ball socket 30 outside the front ball socket 20.

In addition, both sides of the through slot 35 are provided with the blocking rib 36 in the width direction of the through slot 35. Preferably, the blocking rib 36 is made of silicone, rubber or other materials. As shown in FIG. 2, each blocking rib 36 extends along the lengthwise direction of the through slot 35, which increases the friction between the edge of the through slot 35 and the locking body 46, prevents the locking body 46 from falling free of the through slot 35, improves the locking stability of the rear ball socket 30, and prevents the locked rear ball socket 30 from sliding relative to the front ball socket 20.

When the ball throwing rod is in use, the rear ball socket 30 is sleeved on the connecting tube 21 of the front ball socket 20, and the rear ball socket 30 can move backwards and forwards along the connecting tube 21. The second elastic claw 32 of the rear ball socket 30 and the first elastic claw 23 of the front ball socket 20 form an elastic ball socket. The diameter of the elastic ball socket can be adjusted according to the diameter of the selected toy ball. When the size of the elastic ball socket is determined, the flip portion 44 is rotated to lock the rear ball socket 30, and the rear ball socket 30 will not move relative to the front ball socket 20. Toy balls of different sizes on the market can fit into the elastic ball socket, which avoids unnecessary waste of ball throwing rods for matching different toy balls. Besides, the rear ball socket 30 can be adjusted in a stepless manner to reduce the deformation of the elastic ball socket caused by excessive frequency of use, which consequently causes a decrease in the retaining force, and prolongs the service life of the ball throwing rod.

In addition, since users of different heights require the different ball throwing rods that are designed for their comfortable use, the common ball throwing rods have multiple specifications of rod length, resulting a waste of ball throwing rods. In the design of the ball throwing rod in the present embodiment, the rod body 10, the front ball socket 20, and the rear ball socket 30 are combinable and detachable to meet the needs of users of different heights by only replacing the rod bodies 10 of different lengths, which is obviously economical.

Second Embodiment

Figure 4:
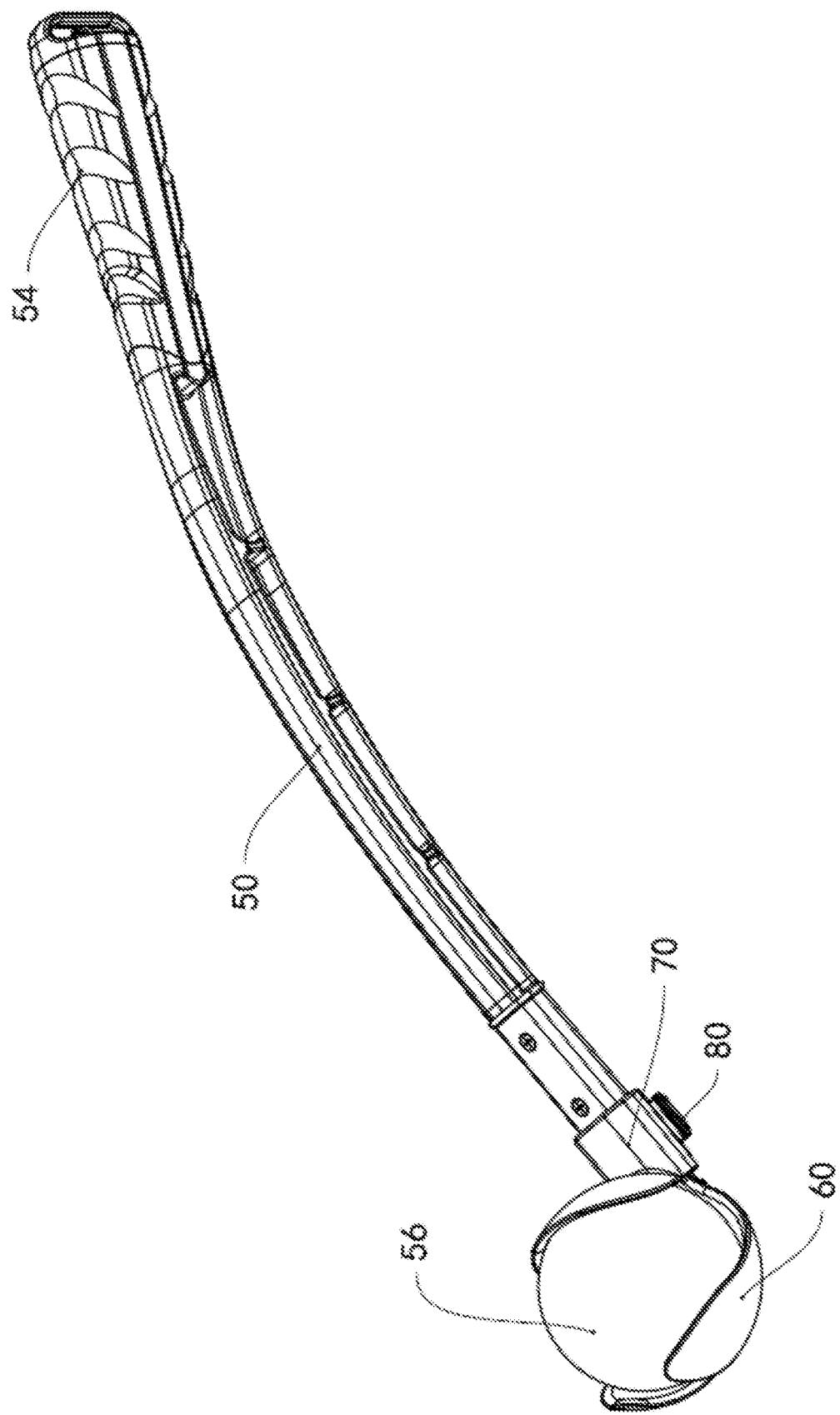
FIG. 4 is a structural schematic diagram of the combined adjustable pet ball-throwing rod with the toy ball according to a second embodiment of the present disclosure.
Figure 5:
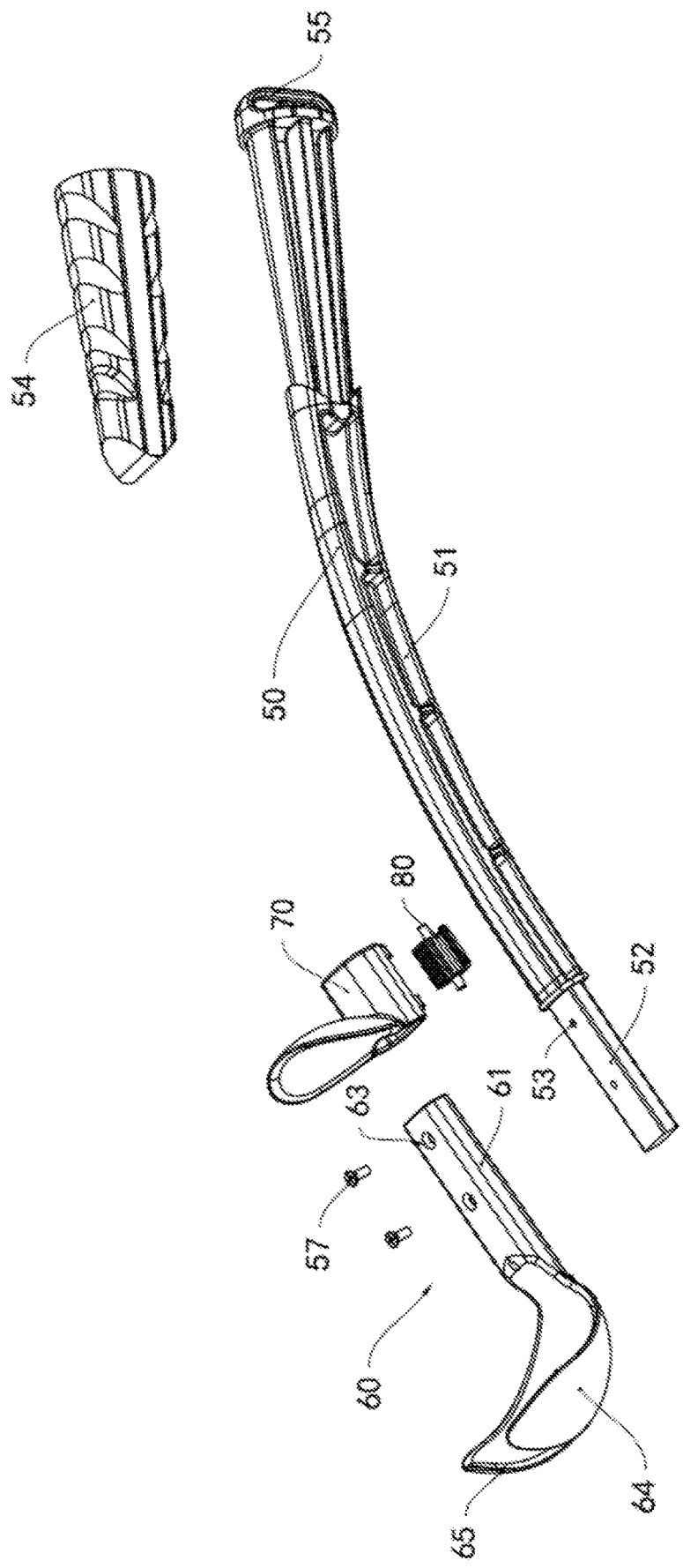
FIG. 5 is an exploded view showing the structures of the combined adjustable pet ball-throwing rod according to the second embodiment of the present disclosure.
Figure 6:
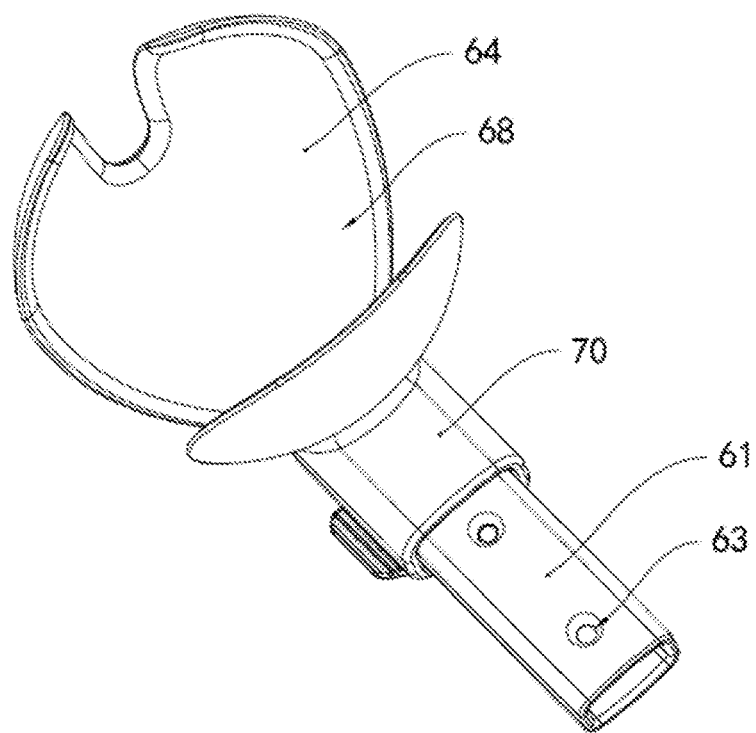
FIG. 6 is a structural schematic diagram of the front ball socket, the rear ball socket, and the locking device of the combined adjustable pet ball-throwing rod according to the second embodiment of the present disclosure.
Figure 7:
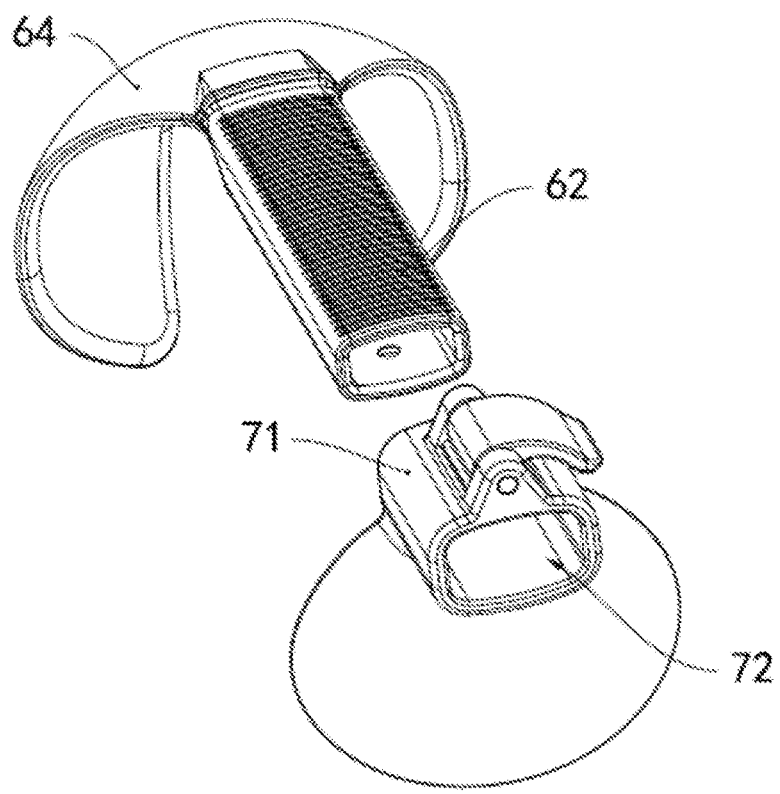
FIG. 7 is an exploded view showing the structures of the front ball socket, the rear ball socket and the locking device of the combined adjustable pet ball-throwing rod from the first angle of view according to the second embodiment of the present disclosure.
Figure 8:
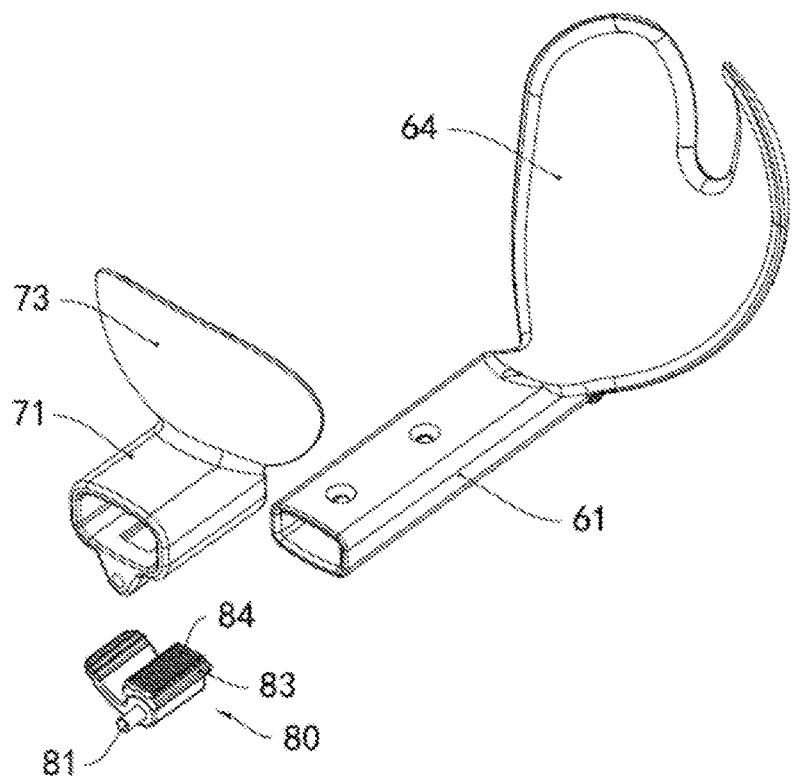
FIG. 8 is an exploded view showing the structures of the front ball socket, the rear ball socket and the locking device of the combined adjustable pet ball-throwing rod from the second angle of view according to the second embodiment of the present disclosure.

Referring to FIGS. 4 and 5, in the present embodiment, the pet ball throwing rod includes the rod body 50. The front ball socket 60 and the rear ball socket 70 are provided at the first end of the rod body 50. The grip 54 is provided at the second end of the rod body 50, and the grip 54 is fixed on the rod body 50. In addition, the second end of the rod body 50 is further provided with the hanging hole 55. A plurality of long grooves 51 are provided on the side wall of the rod body 50 to facilitate the bending deformation of the rod body 50 in the course of throwing the toy ball.

The front ball socket 60 is provided with the hollow connecting tube 61. The first end of the rod body 50 is provided with the base body 52. The base body 52 is provided with two locking holes 53. Preferably, the locking holes 53 are threaded holes. The connecting tube 61 can be sleeved outside the base body 52 of the rod body 50. The top wall of the connecting tube 61 is provided with two through holes 63. Two screws 57 pass through the through hole 63 and are screwed into the locking hole 53 to fix the front ball socket 60 at the first end of the rod body 50.

The front ball socket 60 includes the first elastic claw 64 provided at one end of the connecting tube 61. The middle of the first elastic claw 64 is provided with the opening 65 to fit into toy balls of different sizes. In the present embodiment, the first elastic claw 64 is a curved elastic piece, and the first elastic claw 64 is recessed opposite to the rear ball socket 70, namely, the concave surface of the first elastic claw 64 faces the rear ball socket 70.

Referring to FIGS. 6-9, the rear ball socket 70 is provided with the hollow sleeve 71. The cross section of the hollow sleeve 71 is substantially rectangular, and the inner diameter of the hollow sleeve 71 is slightly larger than the outer diameter of the connecting tube 61, so that the hollow sleeve 70 can be sleeved outside the connecting tube 61 and can move freely relative to the connecting tube, so as to adjust the distance between the front ball socket 60 and the rear ball socket 70.

The rear ball socket 70 is further provided with the second elastic claw 73 located at one end of the hollow sleeve 71. The second elastic claw 73 is also a curved elastic piece and is recessed opposite to the first elastic piece. In other words, the concave surface of the second elastic claw 73 faces the first elastic claw 64, and the convex surface of the second elastic claw 73 faces the grip 54. In this way, the first elastic claw 64 and the second elastic claw 73 form the elastic ball socket 68, and the toy ball 56 can be retained by the first elastic claw 64 and the second elastic claw 73.

The locking device 80 is provided on one side of the rear ball socket 70 to lock the rear ball socket 70 on the front ball socket 60. The locking device 80 includes two rotating lugs 74 and 75. Each of the two rotating lugs 74 and 75 is provided on a side wall of the hollow sleeve 72. Each of the two rotating lugs 74 and 75 is provided with a through hole, and the rotating shaft 81 is arranged in the through holes of the two rotating lugs 74 and 75. The side wall of the hollow sleeve 72 is provided with the elongated through slot 76, and the two rotating lugs 74 and 75 are located at both ends of the through slot 76 in the lengthwise direction of the through slot 76.

The locking device 80 further includes the flip portion 86 and the locking body 82. The flip portion 86 includes the main body 87 and the flipping portion 89. The main body 87 is provided with the eccentric shaft hole 88, and the rotating shaft 81 passes through the shaft hole 88. The locking body 82 is located between the flip portion 86 and the through slot 76. In addition, in the present embodiment, the positioning member 83 is provided between the locking body 82 and the through slot 76. Therefore, the positioning member 83 is provided on the side of the locking body 82 close to the connecting tube 61.

Figure 9:
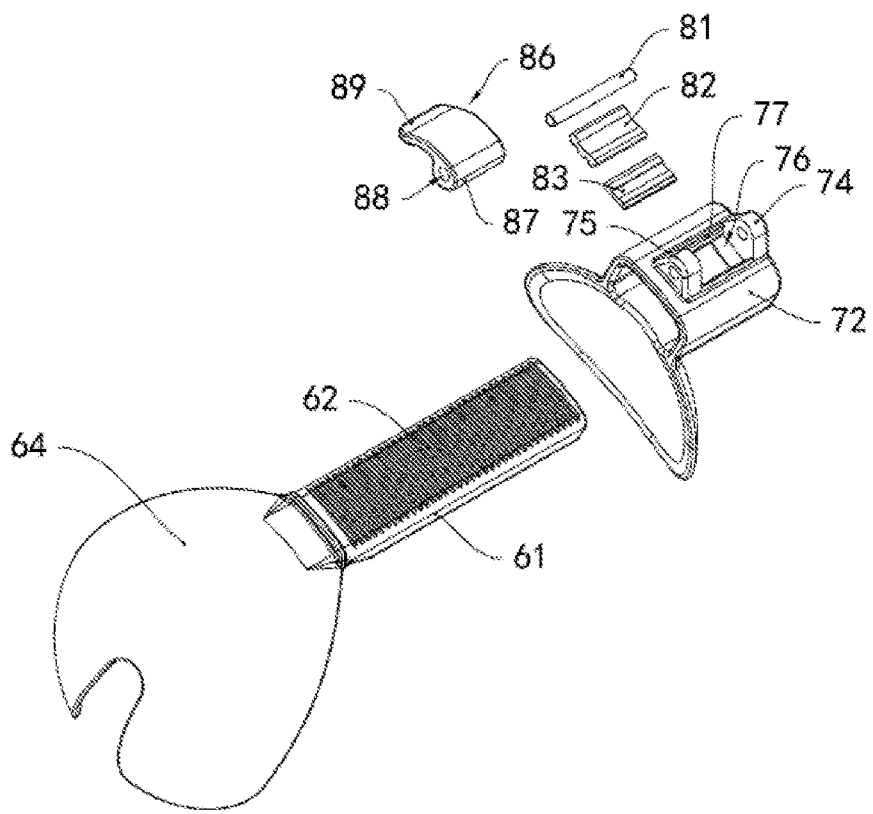
FIG. 9 is an exploded view showing the structures of the front ball socket, the rear ball socket and the locking device of the combined adjustable pet ball-throwing rod from the third angle of view according to the second embodiment of the present disclosure.

In the present embodiment, a plurality of positioning grooves 62 are provided on the surface of the connecting tube 61 facing the positioning member 83 to realize the positioning and positional adjustment between the front ball socket 60 and the rear ball socket 70. In addition, a plurality of positioning protrusions 84 are provided on the surface of the positioning member 83 facing the connecting tube 61 and engaged with the positioning grooves 62. As shown in FIG. 9, the plurality of positioning grooves 62 are parallel to one another, and the plurality of positioning protrusions 84 are also parallel to one another. The quantity of positioning grooves 62 is greater than the quantity of positioning protrusions 84.

When the ball throwing rod is in use, first the front ball socket 60 is fixed to one end of the rod body 50. For example, two screws 57 are employed to fix the connecting tube 61 on the base body 52. Then, the hollow sleeve 71 of the rear ball socket 70 is sleeved outside the connecting tube 61. The position of the rear ball socket 70 is adjusted according to the size of the toy ball. At this time, the flip portion 86 is in the open position, the positioning member 83 is close to one side of the connecting tube 61, and the positioning member 83 passes through the through slot 76 and contacts the connecting tube 61.

The connecting tube 61 of the front ball socket 60 is provided with the positioning grooves 62, and the positioning member 83 is provided with a plurality of positioning protrusions 84. The positioning grooves 62 are engaged with the positioning protrusions 84 to realize a stepwise adjustment between the front ball socket 60 and the rear ball socket 70 and facilitate the positioning of the rear ball socket 70. After the position of the rear ball socket 70 is adjusted, the flip portion 86 is rotated to the closed position to press the locking body 82 and the positioning member 83, and the positioning protrusions 84 of the positioning member 83 are engaged with the positioning grooves 62 of the connecting tube 61 to prevent the rear ball socket 70 from sliding back and forth relative to the front ball socket 60.

Optionally, both sides of the through slot 75 are provided with the blocking rib 77 in the width direction of the through slot 75. The blocking rib 77 can be made of silicone or rubber to increase the friction between the locking body 82 and the through slot 76, which prevents the locking body 82 and the positioning member 83 from falling free of the through slot 76, improves the locking stability of the rear ball socket 70, and prevents the locked rear ball socket 70 from sliding relative to the front ball socket 60.

To sum up, the present embodiment differs from the first embodiment in that the first end of the rod body 50 is not provided with a buckling portion, the front ball socket is not provided with a retaining portion, and the front ball socket 60 and the rod body 50 are directly fixed by two screws 57. In addition, the positioning grooves 62 are provided on the connecting tube 61, and the positioning member 83 is provided on the side of the locking body 82 close to the through slot 76. The front ball socket 60 and the rear ball socket 70 are positioned by the positioning grooves 62 engaged with the positioning protrusions 84 of the positioning member 83.

INDUSTRIAL APPLICABILITY

The combined adjustable ball throwing rod provided by the present disclosure can adjust the positions of the front ball socket and the rear ball socket according to toy balls of different sizes. Specifically, the hollow sleeve of the rear ball socket is detachably sleeved outside the connecting tube of the front ball socket, so that the position of the rear ball socket can be easily adjusted to meet the requirements for toy balls of different sizes. In addition, after the holding force of the elastic claw decreases due to long-term use of the ball throwing rod, the position of the rear ball socket can also be adjusted to increase the holding force.

Additionally, since the front ball socket and the rear ball socket can both be detached from the rod body, when users of different heights need to replace the rod bodies of different lengths, the rod body can be conveniently replaced by detaching the front ball socket and the rear ball socket.

What is claimed is:

1. A combined adjustable pet ball-throwing rod, comprising:
   a rod body;
   wherein
   a front ball socket is fixed to a first end of the rod body; the front ball socket is provided with a hollow connecting tube; a rear ball socket is detachable and slidably sleeved on the hollow connecting tube; the front ball socket and the rear ball socket form an elastic ball socket;
   the rear ball socket comprises a hollow sleeve, the hollow sleeve is sleeved outside the hollow connecting tube, and a locking device is provided on one side of the hollow sleeve to fix the hollow sleeve outside the hollow connecting tube;
   a through slot is provided on a side wall of the hollow sleeve;
   the locking device comprises two rotating lugs provided on the side wall of the hollow sleeve; the two rotating lugs are respectively located at two ends of the through slot in a lengthwise direction of the through slot; each rotating lug of the two rotating lugs extends outward from the side wall of the hollow sleeve;
   a middle of the each rotating lug is provided with a shaft hole, and a rotating shaft is arranged in the shaft hole; a flip portion is rotatably sleeved outside the rotating shaft; the flip portion is provided with an eccentric hole, and the rotating shaft passes through the eccentric hole; and
   the locking device further comprises a locking body, and the locking body is located between the flip portion and the through slot.

2. The combined adjustable pet ball-throwing rod according to claim 1, wherein,
   the hollow connecting tube is provided with a first retaining portion, the first end of the rod body is provided with a first buckling portion, and the first buckling portion is buckled in the first retaining portion.

3. The combined adjustable pet ball-throwing rod according to claim 2, wherein,
   the hollow connecting tube is further provided with a second retaining portion, and the first retaining portion and the second retaining portion are respectively located on two side walls of the hollow connecting tube, wherein the two side walls of the hollow connecting tube are opposite to each other; and
   the first end of the rod body is further provided with a second buckling portion, and one buckling portion of the first and second buckling portions is buckled in one retaining portion of the first and second retaining portions.

4. The combined adjustable pet ball-throwing rod according to claim 2, wherein,
   a through hole is formed on the hollow connecting tube; a locking hole corresponding to the through hole is formed at the first end of the rod body; a locking member passes through the through hole and the locking hole.

5. The combined adjustable pet ball-throwing rod according to claim 3, wherein,
   the first end of the rod body is provided with a base body, and the first and second buckling portions are respectively located on two sides of the base body.

6. The combined adjustable pet ball-throwing rod according to claim 3, wherein,
   a through hole is formed on the hollow connecting tube; a locking hole corresponding to the through hole is formed at the first end of the rod body; a locking member passes through the through hole and the locking hole.

7. The combined adjustable pet ball-throwing rod according to claim 4, wherein,
   a through hole is formed on the hollow connecting tube; a locking hole corresponding to the through hole is formed at the first end of the rod body; a locking member passes through the through hole and the locking hole.

8. The combined adjustable pet ball-throwing rod according to claim 1, wherein,
a through hole is formed on the hollow connecting tube; a locking hole corresponding to the through hole is formed at the first end of the rod body; a locking member passes through the through hole and the locking hole.

9. The combined adjustable pet ball-throwing rod according to claim 1, wherein,
the front ball socket is provided with a first elastic claw provided at one end of the hollow connecting tube, and the first elastic claw is an elastic piece recessed opposite to the rear ball socket.

10. The combined adjustable pet ball-throwing rod according to claim 9, wherein,
an opening is formed in a middle of the first elastic claw, and the opening extends to an edge of the first elastic claw.

11. The combined adjustable pet ball-throwing rod according to claim 1, wherein,
a plurality of positioning grooves are provided on a surface of the hollow connecting tube, wherein the surface of the hollow connecting tube faces the locking device; and
a positioning member is provided on a side of the locking body; at least one positioning protrusion is provided on a surface of the positioning member, wherein the surface of the positioning member faces the hollow connecting tube, and the at least one positioning protrusion is engaged with the plurality of positioning grooves.

12. The combined adjustable pet ball-throwing rod according to claim 10, wherein,
the plurality of positioning grooves are arranged parallel to one another and spaced apart along a lengthwise direction of the hollow connecting tube.

13. The combined adjustable pet ball-throwing rod according to claim 10, wherein,
two or more positioning protrusions are provided on the surface of the positioning member, and a quantity of the plurality of positioning grooves is greater than a quantity of the two or more positioning protrusions.

14. The combined adjustable pet ball-throwing rod according to claim 1, wherein,
each of both sides of the through slot is provided with a blocking rib in a width direction of the through slot.

15. The combined adjustable pet ball-throwing rod according to claim 1, wherein,
the rear ball socket further comprises a second elastic claw provided at one end of the hollow sleeve, and the second elastic claw is an elastic piece recessed opposite to the front ball socket.

16. The combined adjustable pet ball-throwing rod according to claim 15, wherein,
the first elastic claw and the second elastic claw are located on an outer surface of the elastic ball socket.

17. The combined adjustable pet ball-throwing rod according to claim 1, wherein,
a second end of the rod body is provided with a grip.

18. The combined adjustable pet ball-throwing rod according to claim 1, wherein,
a second end of the rod body is provided with a hanging hole.

* * * * *